March 16, 1948. J. B. BRENNAN 2,437,933
HOSE FITTING
Filed Sept. 16, 1944

INVENTOR.
JOSEPH B. BRENNAN
BY
Kwis Hudson Boughton & Williams
ATTORNEYS

Patented Mar. 16, 1948

2,437,933

UNITED STATES PATENT OFFICE 2,437,933

HOSE FITTING

Joseph B. Brennan, Cleveland, Ohio

Application September 16, 1944, Serial No. 554,429

4 Claims. (Cl. 285—84)

This invention relates to hose fittings and aims to provide an improved fitting of this kind which can be readily applied to hose for hydraulic uses and other purposes and with which a strong and leakproof connection is obtained between the hose and fitting.

This application is a continuation in part of copending application Serial No. 451,407 filed July 18, 1942, now Patent 2,393,966.

Another object of this invention is to provide an improved hose fitting having a deformable sleeve portion adapted to be indented into the hose for connecting the fitting therewith.

A further object of the invention is to provide an improved fitting and hose connection in which a hollow body applied to the hose has coaxial sleeve portions and an external endless band, and wherein the outer sleeve portion and endless band are deformable and annularly indented into the hose.

Other objects and advantages of the invention will be apparent from the following description when taken in conjunction with the accompanying sheet of drawings, in which.

Figure 1:
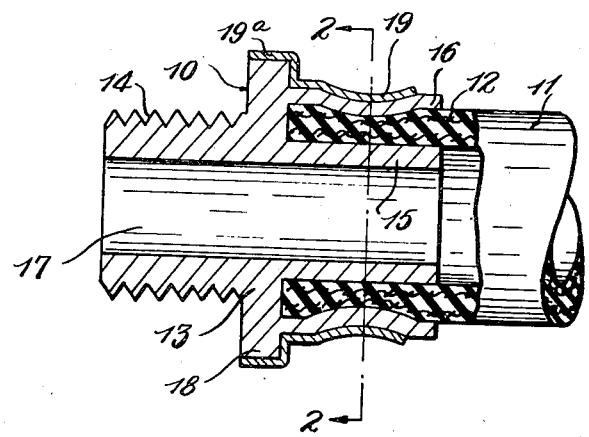
Fig. 1 is an elevation, partly in longitudinal section, showing a hose connection embodying my novel fitting.
Figure 2:
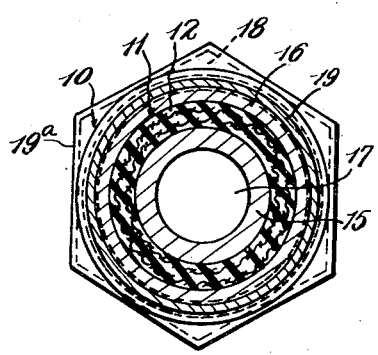
Fig. 2 is a transverse sectional view taken on line 2—2 of Fig. 1.

Proceeding now with a more detailed description of the invention, Figs. 1 and 2 show a hose connection in which my novel fitting 10 is attached to an end of a resilient hose 11. The hose shown in this instance is of the kind formed of rubber or other resilient material and reinforced with one or more layers 12 of suitable fabric or the like. My novel hose fitting is especially desirable for hose of the kind employed in hydraulic systems because a strong and leakproof connection is assured between the hose and fitting, but it should be understood, however, that my fitting can also be applied to hose of various other kinds.

The fitting 10 comprises an elongated body 13 having a threaded connecting portion 14 and a pair of integrally formed coaxially projecting inner and outer sleeve portions 15 and 16 for engagement with the hose 11. The body 13 is preferably formed of metal, although it can be made of plastic or any composition or any other suitable material. A fluid passage 17 extends through the body and communicates with the passage of the hose 11. The body 13 is preferably also provided with the usual polygonal portion 18 to which a wrench or the like can be applied for holding or turning the fitting. As shown in the drawing the inner and outer sleeve portions 15 and 16 are spaced to receive the end of the hose 11 therebetween so that the inner sleeve portion extends into the hose passage and the outer sleeve portion telescopes over the outside of the hose. The fitting 10 also includes an external endless metal band 19 disposed around the outer sleeve portion 16. This band is preferably made of a metal, preferably steel, which has a relatively greater tensile strength than the material of which the body of the fitting is usually formed.

When the fitting 10 has been fully applied to the hose 11 as shown in Figs. 1 and 2, the outer sleeve portion 16 and the external band 19 are annularly indented into the hose for the purpose of connecting the fitting with the hose and forming a leakproof connection therebetween. The indenting of the sleeve portion 16 and the external band 19 into the hose causes the latter to be squeezed or constricted which results in the end of the hose being firmly gripped between the two sleeve portions and causes the hose to be sealingly pressed against the outer surface of the inner sleeve portion 15 to form a substantially leakproof joint between the hose and fitting.

The external band 19 and the outer sleeve portion 16 are deformable so as to enable them to be indented into the hose by suitably applied external pressure. To this end, the outer sleeve portion 16 is preferably, though not necessarily, somewhat thinner than the inner sleeve portion 15. The indenting of the external sleeve portion 16 and endless band 19 into the hose can be carried out with any appropriate apparatus by which they can be spun, crimped or otherwise deformed so as to produce the above described strong and substantially leakproof connection between the hose and fitting. During this operation, the inner sleeve portion 15 serves as an anvil or backing member for the hose 11. The wall of the inner sleeve portion 15 is preferably of a thickness to enable the same to resist deformation during the indenting operation, although, if necessary or desirable, a suitable mandrel or the like can be inserted into the passage 17 for supporting the inner sleeve portion during this operation.

As shown in the drawings, the band 19 is preferably extended over the polygonal portion 18 of the body 13 and such extended portion 19a is of a corresponding polygonal shape which holds the band against rotation relative to the body 13 during the operation of indenting the band 19 and sleeve 16 into the hose 11. Since the metal band or sleeve 19 is made of a stronger material than the body 13, the extended portion 19a of the sleeve will serve as a protection for the polygonal portion 18 of the body and will prevent the same from being damaged by a wrench or other tool applied thereto.

Figure 3:
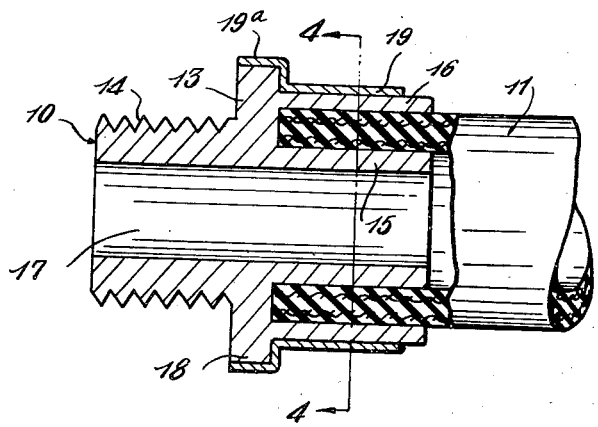
Fig. 3 is an elevational view similar to Fig. 1 but showing the connection before the sleeve portion and endless band are indented into the hose.
Figure 4:
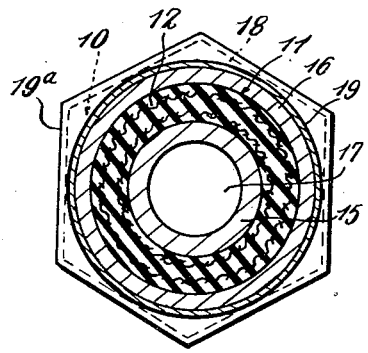
Fig. 4 is a transverse sectional view taken on line 4—4 of Fig. 3.

In Figs. 3 and 4 the fitting 10 is shown applied to the hose 11, but the sleeve portion 16 and the external band 19 have not yet been deformed and indented into the hose. From these views it will be seen that the outer sleeve portion 16 is initially straight or cylindrical in form and extends in coaxial substantially parallel relation with the inner sleeve portion 15. It will also be seen from these views that the external band 19 is initially of a shape enabling the same to be readily slipped into position around the outer sleeve portion 16.

From the foregoing description and the accompanying drawing it will now be understood that I have provided a novel form of hose fitting which can be readily applied to a hose and with which a strong and leakproof connection is assured between the hose and fitting.

While I have illustrated and described my novel hose fitting and connection in more or less detail, it will be understood, of course, that I do not wish to be correspondingly limited but regard my invention as including all changes and modifications coming within the scope of the appended claims.

Having thus described my invention, I claim:

1. In a hose connection, a hollow body having a polygonal portion and a pair of spaced coaxial inner and outer sleeve portions, a resilient hose having an end thereof extending into the space between said sleeve portions, and a deformable metal band surrounding said outer sleeve portion and having a polygonal portion engaging the polygonal portion of said body for holding the band against relative rotation, said band and outer sleeve portion being deformable and being annularly indented into said hose for connecting said body with the hose and sealingly pressing the latter against said inner sleeve portion.

2. A hose fitting comprising a one-piece molded body having a threaded portion and also having coaxial inner and outer sleeve portions spaced apart to receive the end of a resilient hose therebetween, and a metal sleeve of greater tensile strength than said molded body disposed in surrounding engagement with said outer sleeve portion, said outer sleeve portion and said metal sleeve being annularly indented into the hose so as to grip and sealingly press the latter against said inner sleeve portion.

3. A hose fitting comprising a one-piece molded body having a thread thereon and also having a polygonal portion and a pair of inner and outer sleeve portions connected therewith, said sleeve portions being spaced apart to receive the end of a resilient hose therebetween, and a metal sleeve of greater tensile strength than said molded body disposed around and conforming to the shape of said polygonal portion and outer sleeve portion, said outer sleeve portion and said metal sleeve being annularly indented into said hose for connecting said body with the hose and sealingly pressing the latter against said inner sleeve portion.

4. A hose fitting comprising a molded body having a coaxial inner and outer sleeve portion spaced apart to receive the end of a resilient tube therebetween, and a metal sleeve of greater tensile strength than said molded body disposed in surrounding engagement with said outer sleeve portion, said outer sleeve portion and said metal sleeve being annularly indented into the tube so as to grip and sealingly press the latter against said inner sleeve portion.

JOSEPH B. BRENNAN.

REFERENCES CITED

The following references are of record in the file of this patent:

UNITED STATES PATENTS

| Number | Name | Date |
|---|---|---|
| 2,014,313 | Damsel | Sept. 10, 1935 |
| 2,099,915 | Weatherhead | Nov. 23, 1937 |

FOREIGN PATENTS

| Number | Country | Date |
|---|---|---|
| 507,901 | Great Britain | June 23, 1939 |